Oct. 22, 1963   E. W. STILL   3,107,678
PRESSURE GARMENT INFLATION MEANS
Filed Oct. 5, 1959   2 Sheets-Sheet 1
FIG. 1
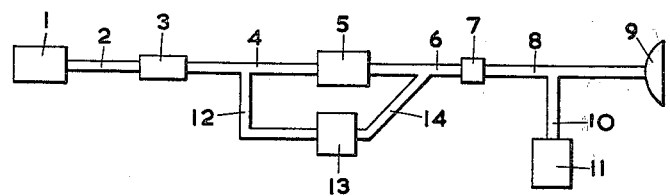
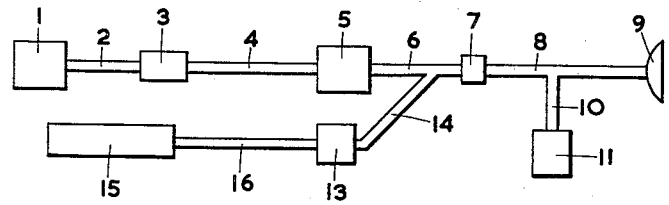
FIG. 2

United States Patent Office 3,107,678
Patented Oct. 22, 1963

3,107,678
PRESSURE GARMENT INFLATION MEANS
Ernest William Still, Yeovil, England, assignor to Normalair Limited, Yeovil, England
Filed Oct. 5, 1959, Ser. No. 844,439
Claims priority, application Great Britain Oct. 17, 1958
1 Claim. (Cl. 137—64)

This invention relates to improvements in inflating pressure garments worn by occupants of aircraft in the event of the pressure within the aircraft falling to that of the ambient atmosphere.

It is usual to provide occupants of pressurised aircraft with breathing apparatus that will supply a breathable gas when required should the pressurisation system of the aircraft fail to operate. This breathable gas is supplied in the form of an air/oxygen mixture and finally oxygen only, according to the altitude of the aircraft and is supplied from oxygen cylinders or liquid oxygen converters via an oxygen regulator which automatically regulates the proportions of breathable gas according to altitude.

In some aircraft that operate at high altitudes, the occupants wear a jerkin like garment which is connected to the aircraft air and/or oxygen supply system between the oxygen regulator and the occupants' breathing mask. Thus, should the pressure within the aircraft be lost through the fuselage becoming damaged for example, the oxygen regulator causes a high flow of oxygen into the pressure garment in order to protect the occupant. The garment being then pressurised, the oxygen regulator functions in the normal manner. However, it has been found that certain conditions can arise during which the normal oxygen regulator is unable to supply oxygen at a rate necessary to inflate the pressure garment in the desirable time. To overcome these conditions, a major change of existing components either in the form of the oxygen supply or of the oxygen regulator itself would be necessary with subsequent penalty of performance in other ways.

It is an object of this invention therefore, to provide means whereby the pressure garment worn by the occupants of aircraft can be inflated and pressurised in the required time without involving any structural alterations to existing types of oxygen regulators.

An embodiment of the invention will now be described by way of example wherein an augmenting oxygen flow valve is connected into the breathable gas supply system of an aircraft. The supply system normally comprises an oxygen storage cylinder or liquid oxygen converter, a pressure reducing valve, an oxygen regulator and breathing mask. Between the oxygen regulator and mask is a connection to the pressure garment. The augmenting oxygen flow valve is connected by way of suitable piping to the upstream and downstream side of the oxygen regulator. This valve is similar in construction and operation to the British Patent No. 785,371, which discloses a demand type servo-operated valve actuated by differential pressure changes across a flexible diaphragm and in this particular invention, the flexible diaphragm is dispensed with and replaced with a barostatic absolute capsule.

Referring to the accompanying diagrammatic drawings:

FIGURE 1 is an installation drawing showing the augmenting flow valve in relation to the main oxygen storage and the pressure garment.

FIGURE 2 is an installation drawing showing an alternative arrangement with the augmenting flow valve in relation to its own oxygen storage.

Figure 3:
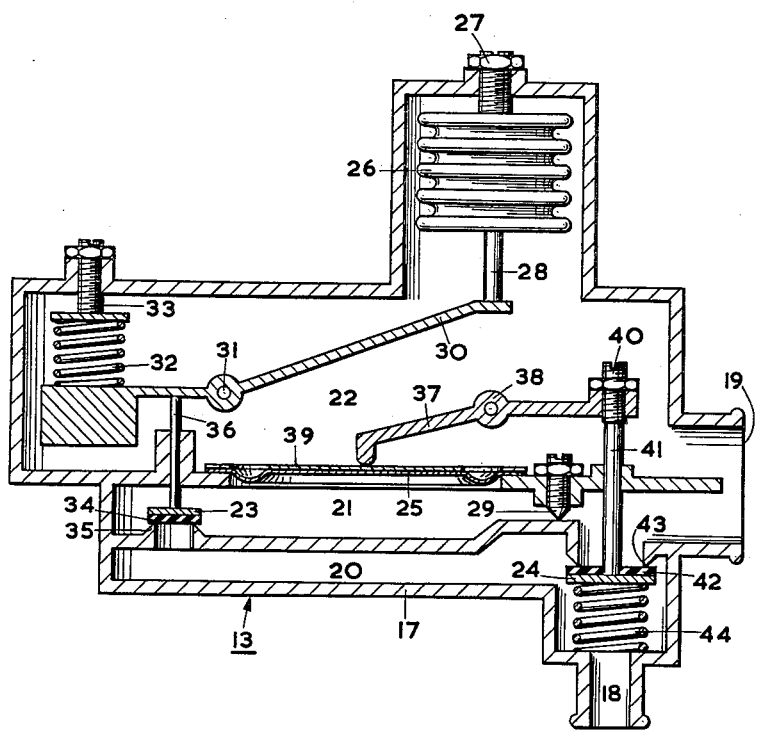
FIGURE 3 is a sectional view of the augmenting flow valve.

In carrying the invention into effect according to one convenient form by way of example as shown in FIGURE 1, item 1 is a source of oxygen under pressure communicating by pipe 2 with reducing valve 3. Pipe 4 supplies oxygen from the reducing valve 3 to regulator 5 which is of normal construction and delivers oxygen to face mask 9 by pipe 6, break away coupling 7 and mask tube 8. Pressure garment 11 is supplied with oxygen by pipe 10 communicating with pipe 8. In order to obtain in an emergency increased flow of oxygen to pressure garment 11 the augmenting flow valve 13 is supplied by pipe 12 and delivers oxygen by pipe 14 downstream of the regulator 5. When no emergency exists no flow takes place past the augmenting flow valve 13 but regulator 5 delivers oxygen or oxygen/air mixture in a normal manner to the face mask.

In carrying out the invention according to a somewhat modified form as shown in FIGURE 2 the augmenting flow valve 13 is supplied with oxygen under pressure from its own source 15 by pipe 16 and delivers the gas downstream of regulator 5 to pressure garment 11.

The augmenting flow valve 13 is shown in diagrammatic form in FIGURE 3 and has a casing 17 with oxygen inlet at 18 and delivery outlet at 19. Valve 13 has three chambers i.e. 20, 21 and 22. Chamber 20 has its inlet at 18 and communicates with chamber 21 by means of servo valve 23, it also communicates with delivery 19 when main valve 24 is open. Metallic diaphragm 25, forming part of the wall of chamber 21 separates said chamber from chamber 22 which houses evacuated bellows 26 having screwed adjusting base 27 and operating pin 28. Chamber 22 freely communicates with outlet 19 but chamber 21 has its communication with 19 limited by adjustable bleed screw 29. When bellows 26 expands during emergency conditions, when the pressure in the breathing line and chamber 22 may correspond with an altitude of 41,000 ft., the pin 28 deflects lever 30 causing it to turn on pivot 31. Lever 30 is urged against pin 28 by the action of spring 32 which presses against the lever 30 near its other end opposed from the bellows pin 28. Spring 32 has adjustable base 33 screwed into the casing 17 of valve 13. Servo valve 23 has a resilient face 34 contacting seating 35 formed from the wall between chambers 20 and 21. Servo valve 23 has stem 36 projecting through a guide formed in the wall between chambers 21 and 22, said stem 36 being raised on expansion of bellows 26. When oxygen is admitted into chamber 21 through servo valve 23 the diaphragm 25 is raised and rotates lever 37 about its pivot 38. Striking plate 39 is secured to the upper face of diaphragm 25. Lever 37 has at the end remote from plate 39 an adjustment screw 40 which contacts stem 41 of main valve 24. This stem is guided in the wall of chamber 22 and valve 24 has a resilient face 42 contacting seating 43 formed from the wall above chamber 20. Spring 44 urges valve 24 against seating 43.

In operation should the aircraft cabin pressurisation system fail to function, oxygen is automatically supplied to the occupants of the aircraft according to altitude by way of the oxygen regulator in the known manner. At the same time, however, the pressure garment will be partially inflated by the flow of oxygen passing to the breathing mask from the regulator. This partial inflaiton causes a temporary pressure drop in the system which is transmitted by way of the communicating pipe to said chamber of the augmenting oxygen flow valve. Accordingly, the barostatic absolute capsule expands and by engagement with a suitable lever to cause the valve to open. Thus communication is established between the upstream and downstream sides of the oxygen regulator and so permits a large flow of oxygen to be delivered into the breathable gas supply line downstream of the oxygen regulator and ensures rapid inflation and pressurisation of the pressure garment worn by the occupant. As soon as a predetermined pressure is restored in the breathing supply line, the absolute barostatic capsule is caused to return to its inoperative position and the augmenting oxygen flow valve closes and the oxygen regulator controls from thereon.

I claim as my invention:

Oxygen flow regulating apparatus for use with pressurized garments comprising a pressurized oxygen source; a pressure regulator connected in a conduit between said source and a pressurized garment; and flow augmenting means disposed in a conduit between said source and the garment to open automatically and permit flow of oxygen therethrough into the garment when the pressure downstream of said regulator falls below a predetermined value, said flow augmenting means including a servo valve, a bellows disposed at the downstream side of said pressure regulator adapted to expand to open said servo valve upon a fall in the pressure at said downstream side below said predetermined value, a servo chamber communicating with said source by said servo valve, an elastic diaphragm one side of which forms one wall of said chamber and the other side of which is open to said downstream side of the regulator, a main valve disposed in a conduit between said source and said downstream side and actuated by movement of said diaphragm to permit flow of oxygen from said source to said downstream side, and means to equalize pressure on both sides of said diaphragm when said servo valve is closed, thereby causing said diaphragm to close said main valve.

References Cited in the file of this patent

UNITED STATES PATENTS

| 2,306,382 | Fink | Dec. 29, 1942 |
| 2,388,674 | Browne | Nov. 13, 1945 |
| 2,857,910 | Pauly | Oct. 28, 1958 |
| 2,963,034 | Cummins | Dec. 6, 1960 |
| 2,974,673 | Culbertson | Mar. 14, 1961 |
| 3,016,061 | Maddock | Jan. 9, 1962 |

FOREIGN PATENTS

| 788,339 | Great Britain | Dec. 23, 1957 |